2,948,715
PIGMENT DYESTUFFS

Arthur Siebert and Kurt Renner, Frankfurt am Main, Germany, assignors to Farbwerke Hoechst Aktiengesellschaft vormals Meister Lucius & Brüning, Frankfurt am Main, Germany, a corporation of Germany No Drawing. Filed Aug. 19, 1958, Ser. No. 755,888

Claims priority, application Germany Aug. 23, 1957

5 Claims. (Cl. 260—204)

The present invention relates to valuable new pigment dyestuffs and to a process of preparing the same; more particularly it relates to the barium, calcium and strontium lakes of azo-dyestuffs corresponding to the following general formula

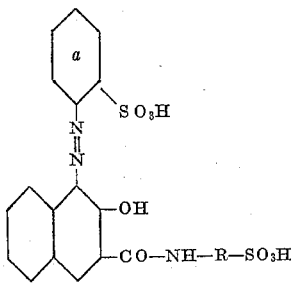

wherein the benzene nucleus $a$ may be substituted by a halogen atom, an alkyl or alkoxy group, R represents a benzene or naphthalene nucleus and the sulfonic acid group stands in para-position to the NH-group.

We have found that valuable pigment dyestuffs are obtained by coupling a diazotized 1-aminobenzene-2-sulfonic acid which is free from further groups imparting solubility in water, with an arylamide of 2,3-hydroxynaphthoic acid of the following formula

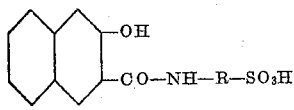

wherein R represents a benzene or naphthalene nucleus and the sulfonic acid group stands in para-position to the NH-group, and converting the azo-dyestuff so obtained into a lake with a water-soluble salt of an alkaline earth metal, preferably a barium salt.

As diazo-components there may be used 1-aminobenzene-2-sulfonic acid and its substitution products, for example 1-amino-4-chlorobenzene-2-sulfonic acid, 1-amino-4-chloro-5-methylbenzene-2-sulfonic acid, 1-amino-5-methyl-5-chlorobenzene-2-sulfonic acid, 1-amino-4-methylbenzene-2-sulfonic acid or 1-amino-4-methoxy-benzene-2-sulfonic acid. Besides the sulfonic acid group in ortho-position, these amines must not contain any further sulfonic or carboxylic acid group.

As coupling components there are used 1-(2',3'-hydroxynaphthoylamino) - benzene - 4-sulfonic acid and 1-(2',3' - hydroxynaphthoylamino) - naphthalene-4-sulfonic acid which can be obtained by reacting the corresponding aminobenzenesulfonic acid or aminonaphthalene-sulfonic acid with 2-hydroxynaphthalene-3-carboxylic acid chloride. The coupling components may also be prepared by reacting the aminoaryl-sulfonic acids with 2-hydroxynaphthalene-3-carboxylic acid in a solvent, preferably pyridine, and forming the 2-hydroxynaphthalene-3-carboxylic acid chloride in the reaction medium by the addition of an acid chloride, such as phosphorus-trichloride or thionyl chloride.

The coupling is carried out in an acetic medium or in a medium alkaline with sodium carbonate. The dyestuffs are isolated, made into a paste with water or dissolved in water and then reacted at a raised temperature with salts of the alkaline earth metals. As salts of the alkaline earth metals, calcium, barium or strontium salts may be used. The conversion into a lake may also be carried out immediately after the coupling without isolation of the dyestuffs. Pigments of an especially soft grain are obtained when the coupling or the conversion into a lake is conducted in the presence of a surface-active dispersing agent, for example the condensation product of oleic acid chloride and methylamino-acetic acid or 2-methylaminoethane-sulfonic acid or the emulsifier mixtures used in the process of German Patent 889,042. It is also possible to convert the dyestuffs into a lake in the presence of a usual substratum, such as aluminium hydroxide or barium sulfate.

The red color lakes so obtained are completely insoluble in the usual organic solvents and distinguished by their good fastness properties, particularly by a very good fastness to migration and to light. They are, therefore, very suitable for coloring high molecular artificial materials, such as polyvinyl chloride. Owing to their thermal resistance they can also be used with advantage for coloring so-called stoving lacquers.

As compared with the color lakes of azo-dyestuffs obtainable by coupling diazotized 1-aminobenzene-2-sulfonic acids containing at least one halogen atom in the benzene nucleus, with 2,3-hydroxynaphthoic acid anilides containing a substituent in ortho-position of the anilido group, described in German Patent 949,077, the pigment dyestuffs of the present invention are distinguished by a considerably improved fastness to solvents. Contrary to the known products, the new dyestuffs do not bleed into the undyed material when they are used for coloring polyvinyl chloride.

The following examples serve to illustrate the invention but they are not intended to limit it thereto, the parts being by weight unless otherwise stated, and the relationship of parts by weight to parts by volume being the same as that of the kilogram to the liter:

Example 1

22.1 parts of 1-amino-4-chloro-5-methylbenzene-2-sulfonic acid are dissolved in 70 parts by volume of hot 2 N-sodium hydroxide solution and 1000 parts by volume of water, filtered and precipitated, while stirring, with 70 parts by volume of 2 N-hydrochloric acid. The compound is mixed with 33 parts by volume of 5 N-hydrochloric acid and then diazotized at 0° C. with 20 parts by volume of 5 N-sodium nitrite solution.

35 parts of 1-(2',3'-hydroxynaphthoylamino)-benzene-4-sulfonic acid are dissolved, while heating, in 100 parts by volume of 2 N-sodium hydroxide solution and 2000 parts by volume of water, filtered and precipitated with 110 parts by volume of 2 N-acetic acid. After the addition of a further 100 parts by volume of 2 N-sodium acetate solution, the diazo-solution is added dropwise within 3 hours at 40 to 45° C. The dark red dyestuff solution is then rendered weakly alkaline with sodium carbonate, the dyestuff is salted out at 80° C. and suction-filtered. In order to convert it into the lake, the dyestuff paste is dissolved again at 90° C. in 2000 parts by volume of water, filtered, and a solution of 48 parts of barium chloride in 400 parts by volume of water is added within 1 hour at 90 to 95° C., while stirring. After cooling to 50° C., the product is suction-filtered, washed with water and dried at 40 to 60° C.

65 parts of a yellowish red color lake of very good fastness to solvents, migration and light are obtained. Owing to its thermal resistance, the product is also suitable as stoving lacquer. The lakes prepared with calcium or strontium salts possess similar properties but an inferior fastness to water.

*Example 2*

11 parts of 1-amino-4-methyl-5-chlorobenzene-2-sulfonic acid are dissolved in 40 parts by volume of hot 2 N-sodium hydroxide solution and 500 parts by volume of water, filtered and precipitated again with 40 parts by volume of 2 N-hydrochloric acid, while stirring vigorously. After the addition of 16 parts by volume of 5 N-hydrochloric acid, the compound is diazotized at 0° C. with 10 parts by volume of 5 N-sodium nitrite solution.

At the same time, 18 parts of 1-(2',3'-hydroxynaphthoylamino)-benzene-4-sulfonic acid are dissolved in 50 parts by volume of 2 N-sodium hydroxide solution and 1000 parts by volume of water, filtered and precipitated with 55 parts by volume of 2 N-acetic acid. After the addition of 50 parts by volume of 2 N-sodium acetate solution, the diazo-solution is added dropwise, while stirring, in the course of 3 hours at 40 to 45° C. The dark red dyestuff solution is rendered alkaline with sodium carbonate solution, salted out at 80° C. and the dyestuff is suction-filtered. It is converted into the lake, as described in Example 1, with a solution of 24 parts of barium chloride in 200 parts by volume of water. 33 parts of a yellow-red color lake of very good fastness to solvents, migration and light are obtained.

*Example 3*

20.3 parts of 1-amino-4-methoxybenzene-2-sulfonic acid are dissolved in 50 parts by volume of 2 N-sodium hydroxide solution and 60 parts by volume of water and precipitated, while stirring, with 50 parts by volume of 2 N-hydrochloric acid. After the addition of 33 parts by volume of 5 N-hydrochloric acid, the compound is diazotized at 0° C. with 20 parts by volume of 5 N-sodium nitrite solution. In order to effect the coupling, 36 parts of 1-(2',3'-hydroxynaphthoylamino)-benzene-4-sulfonic acid are dissolved in 100 parts by volume of 2 N-sodium hydroxide solution and 2000 parts by volume of water, the solution is rendered alkaline with 25 parts by volume of 2 N-sodium carbonate solution, and the diazo-solution is added dropwise, while stirring, within 45 minutes at 20 to 25° C. The dark red solution is stirred for one hour, the dyestuff is then salted out and suction-filtered. To convert it into the lake, the dyestuff is dissolved again in 2000 parts by volume of hot water, a suspension of 14 parts of aluminum hydroxide in 400 parts by volume of water is added as substratum and the dyestuff is then converted into the lake at 80° C. with a solution of 40 parts of barium chloride in 300 parts by volume of water. After 1 hour the red pigment dyestuff is suction-filtered, washed and dried at 40 to 60° C. 76 parts of a red color lake of good fastness to solvent, migration and light are obtained.

*Example 4*

17.3 parts of 1-aminobenzene-2-sulfonic acid are dissolved in 50 parts by volume of 2 N-sodium hydroxide solution and 500 parts by volume of water and precipitated again with 50 parts by volume of 2 N-hydrochloric acid, while stirring. In order to bring about diazotization, 33 parts by volume of 5 N-hydrochloric acid are added and 20 parts by volume of 5 N-sodium nitrite solution are introduced dropwise at 10° C. Furthermore, 36 parts of 1-(2',3'-hydroxynaphthoylamino)-benzene-4-sulfonic acid are dissolved in 100 parts by volume of 2 N-sodium hydroxide solution and 2000 parts by volume of water, filtered and precipitated with 110 parts by volume of 2 N-acetic acid, and 100 parts by volume of 2 N-sodium acetate solution are added. The coupling is carried out at 40 to 45° C. and is complete after 2 hours. In order to isolate the dyestuff, the dark red solution is rendered weakly alkaline with sodium carbonate solution, solid common salt is added at 80° C. and the precipitated bright red dyestuff is strongly suction-filtered. The dyestuff is then dissolved in 2000 parts by volume of water at 80° C. and mixed with 1 part of an emulsifier, such as the condensation product from oleic acid chloride and methylamino-acetic acid, and it is converted into the lake by adding dropwise 48 parts of barium chloride in 400 parts by volume of water within 1 hour at 70° C. Stirring is continued until the temperature has fallen to 50° C. The red-brown pigment dyestuff is then suction-filtered, washed with water and dried at 40 to 60° C.

62 parts of a color lake are obtained which colors polyvinyl chloride bluish red, full tints of an excellent fastness to solvents, migration and light. Owing to its thermal resistance it is also suitable as stoving lacquer.

The dyestuff can also be converted into the lake in the manner described above immediately after the coupling without previous isolation.

*Example 5*

20.7 parts of 1-amino-4-chlorobenzene-2-sulfonic acid are dissolved in a mixture of 50 parts by volume of 2 N-sodium hydroxide solution and 750 parts by volume of water, filtered and precipitated again, while stirring, with 50 parts by volume of 2 N-hydrochloric acid. Diazotization is brought about after the addition of 33 parts by volume of 5 N-hydrochloric acid at 0° C. with 20 parts by volume of 5 N-sodium nitrite solution. In the meantime, 36 parts of 1-(2',3'-hydroxynaphthoylamino)-benzene-4-sulfonic acid are dissolved in 100 parts by volume of hot 2 N-sodium hydroxide solution and 2500 parts by volume of water, filtered and precipitated again with 110 parts of volume of 2 N-acetic acid. After the addition of 100 parts by volume of 2 N-sodium acetate solution, the coupling is carried out within 2 hours at 35 to 40° C. The red suspension is then rendered weakly alkaline with sodium carbonate solution, the dyestuff is salted out at 80° C. and well suction-filtered. It is converted into the lake in the manner described in Example 1 with a solution of 48 parts of barium chloride in 200 parts by volume of water with the addition of 1 part of an emulsifier mixture prepared as described in German Patent No. 889,042 from 60 parts of the sodium salt of alkylsulfamidoacetic acid, 40 parts of spindle oil and 15 parts of water. After drying at 40 to 60° C., 62 parts of a yellowish red pigment dyestuff of good fastness properties are obtained.

*Example 6*

18.7 parts of 1-amino-4-methylbenzene-2-sulfonic acid are dissolved by ading 50 parts by volume of hot 2 N-sodium hydroxide solution and 600 parts by volume of water, filtered and precipitated again with 50 parts by volume of 2 N-hydrochloric acid. Diazotization is brought about by adding 33 parts by volume of 5 N-hyrochloric acid and introducing dropwise at 0° C. 20 parts by volume of 5 N-sodium nitrite solution. Furthermore, 36 parts of 1-(2',3'-hydroxynaphthoylamino)-benzene-4-sulfonic acid are dissolved in 100 parts by volume of hot 2 N-sodium hydroxide solution and 1000 parts by volume of water, and after the addition of 25 parts by volume of 2 N-sodium carbonate solution the diazo-solution is added at 20 to 25° C., while stirring. After 1 hour, the dyestuff is salted out and suction-filtered. It is converted into the lake in the manner described in Example 1 with a solution of 48 parts of barium chloride in 400 parts by volume of water. 60 parts of a red pigment dyestuff of similar good fastness properties are obtained.

*Example 7*

10.4 parts of 1-amino-4-chlorobenzene-2-sulfonic acid are dissolved in 30 parts by volume of hot 2 N-sodium hydroxide solution and 300 parts by volume of water and precipitated again with 30 parts by volume of 2 N-hydrochloric acid, while stirring. After the addition of 16 parts by volume of 5 N-hydrochloric acid, the compound is diazotized at 0° C. with 10 parts by volume of 5 N-sodium nitrite solution. The diazo-solution is then added dropwise at 40 to 45° C. within 2 hours to 20 parts of 1-(2',3'-hydroxynaphthoylamino)-naphthalene-4-sulfonic acid which have been finely dispersed by dissolving them in 50 parts by volume of 2 N-sodium hydroxide solution and 2000 parts by volume of water and reprecipitating them with 55 parts by volume of 2 N-acetic acid, while stirring. The dark red solution is then rendered weakly alkaline with sodium carbonate solution, the dystuff is salted out at 80° C. with common salt and suction-filtered.

The dyestuff is converted into the lake by dissolving the paste in 2000 parts by volume of hot water, filtering, and adding dropwise at 90° C. within 30 minutes a solution of 20 parts of barium chloride in 200 parts by volume of water. The mixture is stirred at 90° C. for a further 30 minutes, suction-filtered and washed with water. After drying at 40 to 60° C., 32 parts of a bluish red pigment dyestuff of very good fastness properties are obtained.

We claim:

1. Lakes selected from the group consisting of barium, calcium and strontium lakes of azo-dyestuffs corresponding to the following general formula

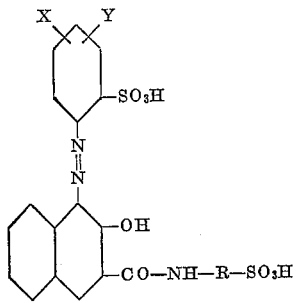

wherein X and Y stand for members selected from the group consisting of hydrogen, chlorine, methyl and methoxy, R represents a member selected from the group consisting of benzene and naphthalene, and wherein the sulfonic acid group stands in p-position to the NH-group.

2. The barium lake of the azo-dyestuff corresponding to the following formula

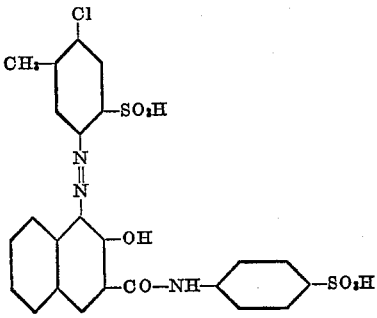

3. The barium lake of the azo-dyestuff corresponding to the following formula

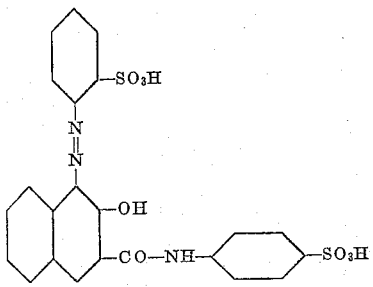

4. The barium lake of the azo-dyestuff corresponding to the following formula

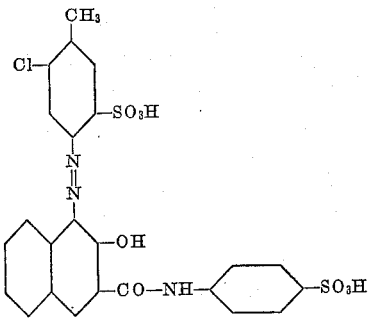

5. The barium lake of the azo-dyestuff corresponding to the following formula

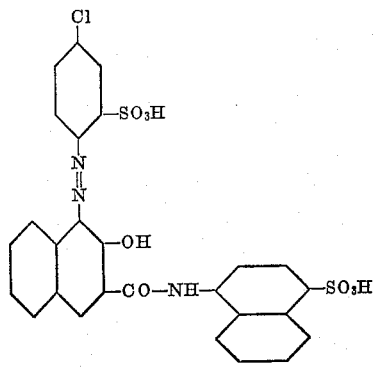

References Cited in the file of this patent
UNITED STATES PATENTS

| | | |
|---|---|---|
| 1,815,133 | Sohst | July 21, 1931 |
| 2,811,515 | Stocker | Oct. 29, 1957 |